United States Patent Office 3,004,557
Patented Oct. 17, 1961

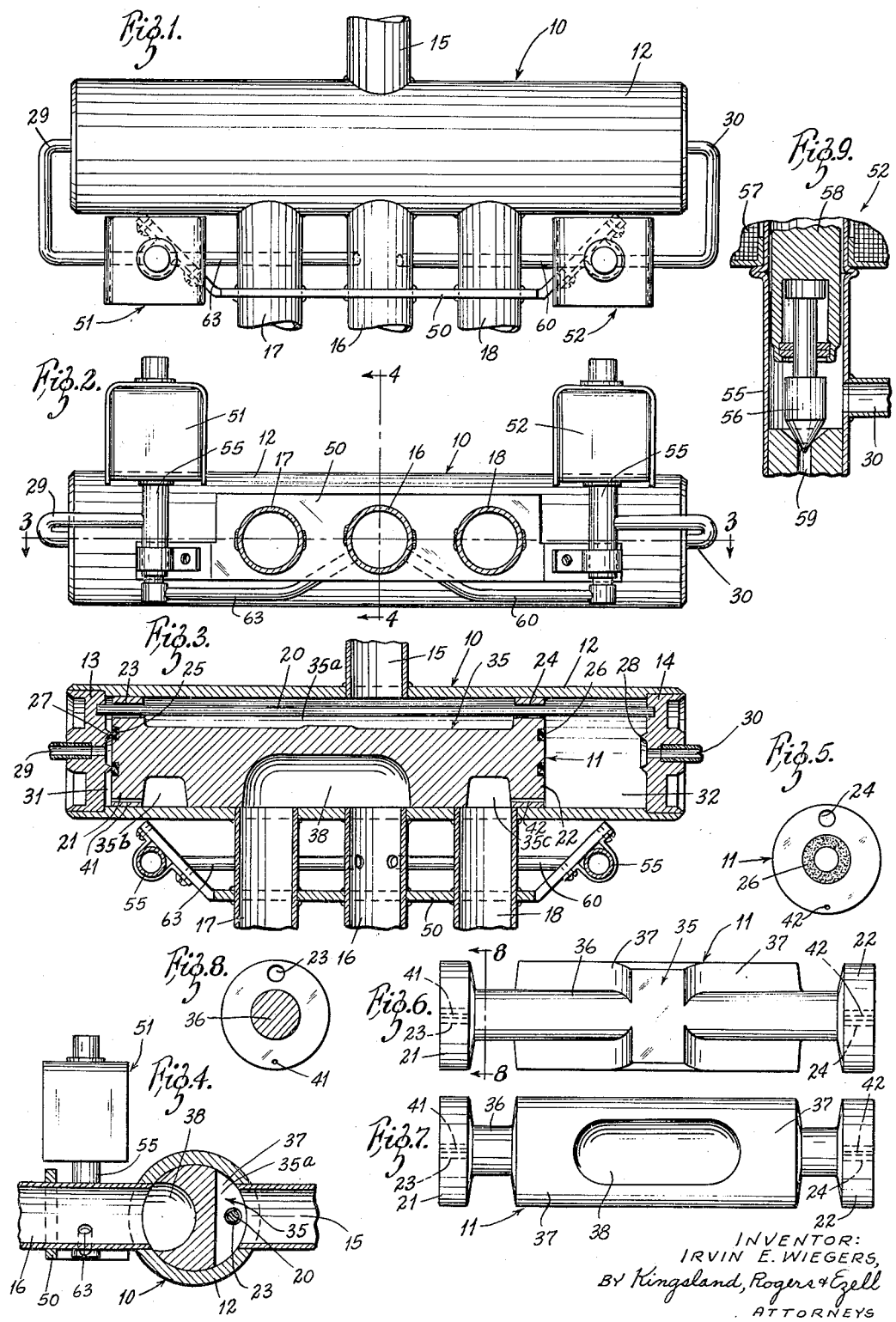
Oct. 17, 1961 — I. E. WIEGERS — 3,004,557
FOUR-WAY CHANGE-OVER VALVE
Filed May 29, 1957
INVENTOR:
IRVIN E. WIEGERS,
BY Kingsland, Rogers & Ezell
ATTORNEYS

3,004,557
FOUR-WAY CHANGE-OVER VALVE
Irvin E. Wiegers, St. Louis, Mo., assignor to Alco Valve Company, St. Louis, Mo., a corporation of Missouri
Filed May 29, 1957, Ser. No. 662,467
4 Claims. (Cl. 137—625.29)

The present invention relates to a four-way change-over valve, especially one of the type used in reverse cycle refrigerating devices. However, it can be used with other devices having similar problems.

In general, this valve comprises a cylinder and a valve piston movable to opposite ends within the cylinder. There is a high-pressure inlet, a low-pressure outlet and two working line connections. The objective of the valve is to connect the first work line to the high pressure inlet and the other to the low pressure line, and selectively to reverse those connections.

It is desirable to make the valve element, which is the piston, in the general form of a D-valve, because this simplifies the arrangement of the connections and makes the valve easier to construct as well to sevice. More especially, it enables the valve to be made narrower in diameter, which improves its leakage factor. However, there remain problems of keeping a circular, D slide properly aligned with the ports and overcoming the difficulties of the pressure imbalances acting upon it with the possible leakage around the sealing sections or lands of the valve. The control of the valve poses problems.

Objects of the present invention include the reduction or elimination of the difficulties attendant upon pressure imbalances and the tendency of the round piston to turn in the cylinder so that its valve passages are out of registry with the ports in the cylinder. Other objects include the provision of means to reduce or to overcome the problem of leakage, and also to provide a simplified control. Other objects will appear in the description to follow.

In the drawings:

FIGURE 1 is a plan view of a valve assembly made in accordance with the present invention;

FIGURE 2 is an elevation thereof;

FIGURE 3 is a longitudinal section taken on line 3—3 of FIGURE 2;

FIGURE 4 is a transverse section taken on line 4—4 of FIGURE 2;

FIGURE 5 is an end view of the piston slide;

FIGURE 6 is an elevation of the piston slide looking from the rear;

FIGURE 7 is an elevation of the slide viewed from the front;

FIGURE 8 is a transverse section taken on line 8—8 of FIGURE 6; and

FIGURE 9 is a fragmentary diametrical section through one of the electromagnetic valves.

The valve comprises a cylinder generally indicated at 10 and a piston generally indicated at 11. The cylinder is illustrated as being formed of a tube 12, the ends of which are slightly bored out to receive cylinder heads 13 and 14 that may be fitted and sealed thereinto, as by soldering.

The cylinder has a high-pressure inlet pipe 15 entering mid-way between its ends. Diametrically opposite, the cylinder has a low-pressure outlet pipe 16. The two connections may be reversed, but for reasons that will appear, it is much preferable that the pipe 15 be the high pressure line because of certain sealing features of this construction.

Alongside of the low-pressure connection 16, and preferably in line with it, there are two working lines, namely, a first working line 17 and a second working line 18.

If the cylinder 12 is made of a piece of stock tubing, the various pipes 15, 16, 17 and 18 may be inserted into appropriately drilled holes in the wall of the cylinder 12, and soldered therein as indicated. The length of the several pipes will depend upon the circumstances of construction and use.

The two cylinder heads 13 and 14 have a slide guide rod 20 extending between them. The piston 11 is preferably formed out of a single piece, finished by a single machining operation. It has opposite piston heads 21 and 22 provided with holes 23 and 24 that freely receive the rod 20. The two faces of the piston heads 21 and 22 are likewise provided with valve sealing rings 25 and 26 that may be inserted in appropriate circular grooves therein. These rings are designed to seal effectively with valve elements 27 and 28 on the respective cylinder heads 13 and 14 as the piston 11 moves back and forth to its extreme positions. In FIGURE 3, the valve elements 25 and 27 are shown as engaged, thereby cutting off communication from within the ring of the valve seat 27 to the space outside thereof.

A fluid pressure passage 29 extends through the cylinder head 13, and a like passage 30 extends through the cylinder head 14. As is evident from FIGURE 3, the passage 29 is checked off by seating of the valve 25, while the passage 30 at the opposite end of the cylinder is freely open to the righthand piston 22. In like manner, when the piston 11 moves to the right end of the cylinder 10, the valve 26 will close, while the passage 29 is open through the valve 25. For convenience, the lefthand pressure chamber between the cylinder head 13 and the piston 21 is designated at 31 while the right hand pressure chamber is designated at 32.

The piston 11 is cut away on its upper surface between the two piston heads 21 and 22 to provide a fluid passage space 35 which has portions 35a, 35b, and 35c that are always in communication. This is provided by forming the piston in the manner of having a piston rod 36 that can be considered as extending all the way from the piston head 21 to the piston 22. Also, at its middle portion, the so-called piston rod 36 is provided with supplemental land elements 37 that are somewhat more than semi-cylindrical. The bottom portion of the land 37, has a recess 38 to provide what amounts to a D-valving space. The result of all of the foregoing is that the space 35a constantly communicates with the high pressure inlet 15 and can conduct high pressure constantly to its portions 35b and 35c. The D-passage 38 is always in communication with the low pressure outlet 16, and may also register with one of the work lines 17 and 18.

The passage 35b is supplied with a bleeder passage 41 extending through to the lefthand base of the piston 21 and hence connecting the high pressure line constantly with the pressure chamber 31. Similarly, piston 22 has a bleeder passage 42 that constantly connects that high pressure line with the pressure chamber 32. These passages are provided in case the fit of the piston 11 around the rod 20 is too close to admit high pressure at all times to the two pressure chambers 31 and 32.

The land area between the passage 35b of the piston 11 and the passage 38, and that between the passage 35c and the passage 38, as well as the spacing of the several ports 16, 17 and 18 is such that one set of passages is cut off before the other set of passages is opened.

The piston 11, as stated, is preferably made of a single piece. It can be cast without coring, and since a single machining operation can finish both the pistons and the land, the sealing of the valve and the pistons is much better than where the parts are separately made and assembled.

The valve is operated back and forth by fluid pressure controlling means which may take the form of two solenoid valves, as illustrated, although it may be operated by other like means such as a 3-way valve, as is known in the art. There is an anti-distortion bar 50 that has holes through which the three pipes 16, 17 and 18 fit and are preferably soldered. It aids in holding the pipes 16—18 aligned, and preventing their being spread or distorting the cylinder 10 during connecting and disconnecting of the valve assembly into a system. This enables lighter tubing to be used for the cylinder. The distortion is especially to be avoided on the low-pressure side where the valve slide must maintain sealing contact with the cylinder. The bar 50 has backturned ends to which are secured the lower tubes of similar magnetic valves 51 and 52.

FIGURE 9 illustrates parts of the valve 52. In it, the exhaust line 30 from the pressure chamber 32 connects into the valve tube 55. The valve tube 55 contains a valve 56 that may be suitably operated by a magnetic coil 57 acting upon a core 58 in the known maner. The valve 56 can close off a passage 59 or can open the same to connect with the passage 30.

The passage 59 connects by means of a pipe 60 into the low pressure outlet 16 as is evident from FIGURES 1 and 2. In like manner, the valve 51 can connect the exhaust passage 29 with another pipe 63 connecting into the low pressure outlet 16 or it can break such communication.

Use

In use, this valve may be connected, for example, in a refrigeration system having a compressor, a condenser-evaporator, and an evaporator-condenser, with the usual appurtenances thereto. When such a combination is provided for reverse cycle operation, the condenser alternates as an evaporator and the evaporator alternates as a condenser, all as is known in the art. In this typical usage the pipe 15 is connected to the outlet side of the compressor so that it will obtain high pressure refrigerant. Line 16 is connected back into the compressor.

The line 17 is attached to one condenser-evaporator and the pipe 18 is connected into the other evaporator-condenser. From the foregoing it will be seen that high pressure is normally constantly admitted to the "back" of the piston as well as between the piston heads 21 and 22, by the space 35a, 35b, and 35c. Also the high pressure has access to both pressure chambers 31 and 32 through the passages 41 and 42, and possibly also through the two holes 23 and 24. When both of the valves 51 and 52 are either opened or closed, there will be balanced conditions in the two pressure chambers 31 and 32 and the piston 11 will remain in whatever position it had previously been put. However, normally, in operation one or the other of the two valves 51 and 52 will be energized or held open.

In the conditions illustrated in FIGURE 3, the valve 51 is opened so that the exhaust passage 29 is connected to the low pressure line 16. Since the exhaust line is much larger than the inlet bleeder passage means into the chamber 31, opening of the valve 51 reduces the pressure chamber 31 to suction line pressure while the pressure chamber 32 is maintained at compression pressure, so that the piston is firmly held in the indicated position. Under these circumstances, high pressure passes from the pipe 15 through the valve space 35a, the space 35c into the working line 18. In the meanwhile the other working line 17 is connected by the valve passage 38 to the low pressure side 16. In the typical installation, it may be assumed that the foregoing means that the compressor is connected through the valve to the line 18 and into a condenser-evaporator connected to the line 18, thence through an expansion device to an evaporator-condenser connected to the line 17, through the passage 38 of the valve, to the line 16 and back to the compressor.

Under the foregoing conditions, if the first condenser-evaporator were outdoors and the second evaporator-condenser were in a room, the system could be cooling a room. If the valve 51 is closed and the valve 52 is opened, however, the conditions in the main regulator valve will be reversed. Under such circumstances, the exhaust from the pressure chamber 31 is stopped, whereas the pressure chamber 32 is opened to exhaust by way of the pipe 30, the valve 52, the pipe 60 and the suction line 16. When this occurs then, the high pressure constantly going into the chamber 31 pushes the piston 21, and the whole assembly 11, to the right until it strikes the other end closing the valve 26. As it moves, it will disconnect the working line 18 from the space 35c before it connects the line 18 to the valve space 38, which is always in communication with the suction line 16, and before it connects the other working line 17 with a high pressure space 35b.

After the piston 11 is thus moved completely to the right, the high pressure will be admitted by way of the space 35b to the working line 17 whereas the working line 18 will be connected by the space 38 to the suction line 16. With the typical usages heretofore mentioned, this will direct the refrigerant first to the indoor evaporator-condenser, and then to the outdoor condenser-evaporator, which causes the heating of the room.

The passages 41 and 42 insure that there will always be a flow of high pressure to both of the two pressure chambers. However, when the piston is in one of its extreme positions, its end valves 25 or 26, respectively, will prevent a loss of pressure through the bleed lines. Typically, in FIGURE 3, the valve 25 seals off the exhaust of such pressure as escapes into the pressure chamber 31, so that it cannot reach the outlet 29. There will be an annular portion of the pressure chamber 31 that is subjected to high pressure. However, the valve will remain firmly seated because in the opposite pressure chamber 32 operates on the piston area within the valve seat 28 as well as that outside the valve seat 28 and so exerts a greater force.

It will be noticed that the piston is long and narrow. This can be accomplished with a valve of this type where the three ports 16, 17 and 18 are aligned along the cylinder rather than spaced around it. In the illustrated embodiment, the piston is at least three times as long as its diameter.

The small diameter that is possible in the present arrangement, reduces the leakage from the high pressure pipe 15 to the low pressure pipe 16, around the slide 11, below that occurring with larger diameter slides. This leakage occurs because of excessive undersizing of the diameter of the slide 11, such as may happen if the cylinder has its internal diameter at its maximum tolerance and the slide has its external diameter at minimum tolerance. It is evident that the high pressure acting on the upper surface 35a in FIGURE 3, presses the slide oppositely against the cylinder. If the slide be undersized, any gap between it and the cylinder is smaller at the sides of the narrow slot (as shown in FIGURE 4) than it would be at the sides of a slot twice as wide. Hence the present design reduces leakage.

What is claimed is:

1. A valve comprising a housing having spaced ends joined together by a thin walled tube, the tube having a cylindrically shaped internal surface, a slide positioned within the tube, the slide having cylindrically shaped ends of substantially the same diameter as the internal diameter of the tube, the slide being shorter than the tube and being longitudinally slidable between extreme positions within the tube, the slide including a pair of rods extending from the cylindrical ends, the diameter of the rods being smaller than the diameter of the slide ends, the slide further including a partical cylinder supported between the rods, the partial cylinder being more than half a cylinder and having substantially the same diameter as the diameter of the cylindrical ends of the slide, the ends of the partial cylinder being spaced by the rods from the ends of the slide with the spaces thus defined comprising fluid conduits, the non-cylindrical portion of the partial cylinder defining a pressure surface, the area between the pressure surface and the part of the internal surface of the tube opposite the land comprising a high pressure chamber, a high pressure inlet port through the tube and communicating with the high pressure chamber, a low pressure outlet port through the side of the tube opposite the high pressure inlet port, a recess in the side of the partial cylinder opposite the pressure surface, the recess having ends spaced from the longitudinal ends of the partial cylinder and spaced from one another by more than the slidable distance of the slide, the recess being in continual communication with the low pressure outlet during sliding movement of the slide, a pair of auxiliary inlet-outlet ports through the tube in longitudinal alignment with the low pressure outlet port, the low pressure outlet port being positioned between the auxiliary ports, the distance between each auxiliary port and the low pressure outlet port and the length of the recess between the ends of the recess being such that one of the auxiliary ports is in communication with the recess in one extreme position of the slide and the other auxiliary port is in communication with the recess in the opposite extreme position of the slide, and the position of the fluid conduits being such that in each extreme position of the slide the auxiliary port out of communication with the recess is in communication with one of the fluid conduits, and means for causing the slide to shift between its extreme positions.

2. The combination of claim 1 including means for preventing rotation of the slide within the tube.

3. The combination of claim 1 wherein there is a pipe connected to each port, the length of the tube is at least three times its internal diameter and there is a reinforcing member connected to each of the auxiliary port pipes, the low pressure outlet port and to the tube.

4. The combination of claim 3 wherein the reinforcing member comprises a plate of greater width than the outside diameters of the pipes to which it is attached, the plate having a portion with a hole through it for each pipe, each pipe extending through one of the plate holes, and wherein the portion of the plate having holes through it is spaced from the tube and the ends of the plate are bent toward the tube and are attached thereto.

References Cited in the file of this patent

UNITED STATES PATENTS

| | | |
|---|---|---|
| 837,644 | Reilly | Dec. 4, 1906 |
| 1,047,159 | Bowers | Dec. 17, 1912 |
| 1,316,255 | Rauch | Sept. 16, 1919 |
| 1,911,285 | O'Brien | May 30, 1933 |
| 2,616,449 | Maha | Nov. 4, 1952 |
| 2,836,196 | Gunn | May 27, 1958 |

FOREIGN PATENTS

| | | |
|---|---|---|
| 593,365 | Germany | Feb. 28, 1934 |